Figure 2:
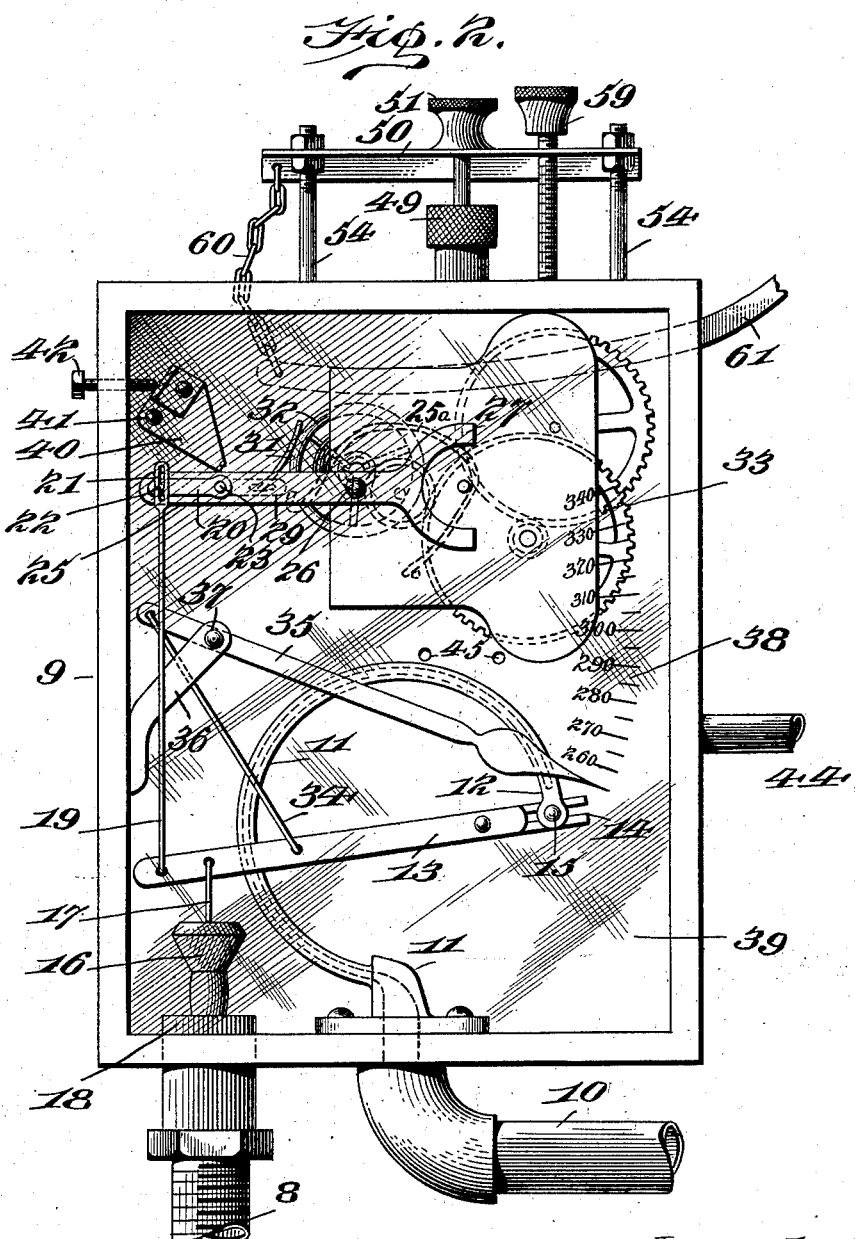

No. 752,703. PATENTED FEB. 23, 1904.
C. E. ORNDORF.
CONTROLLING DEVICE FOR VULCANIZERS OR LIKE APPARATUS.
APPLICATION FILED JUNE 15, 1903.
NO MODEL. 3 SHEETS—SHEET 1.
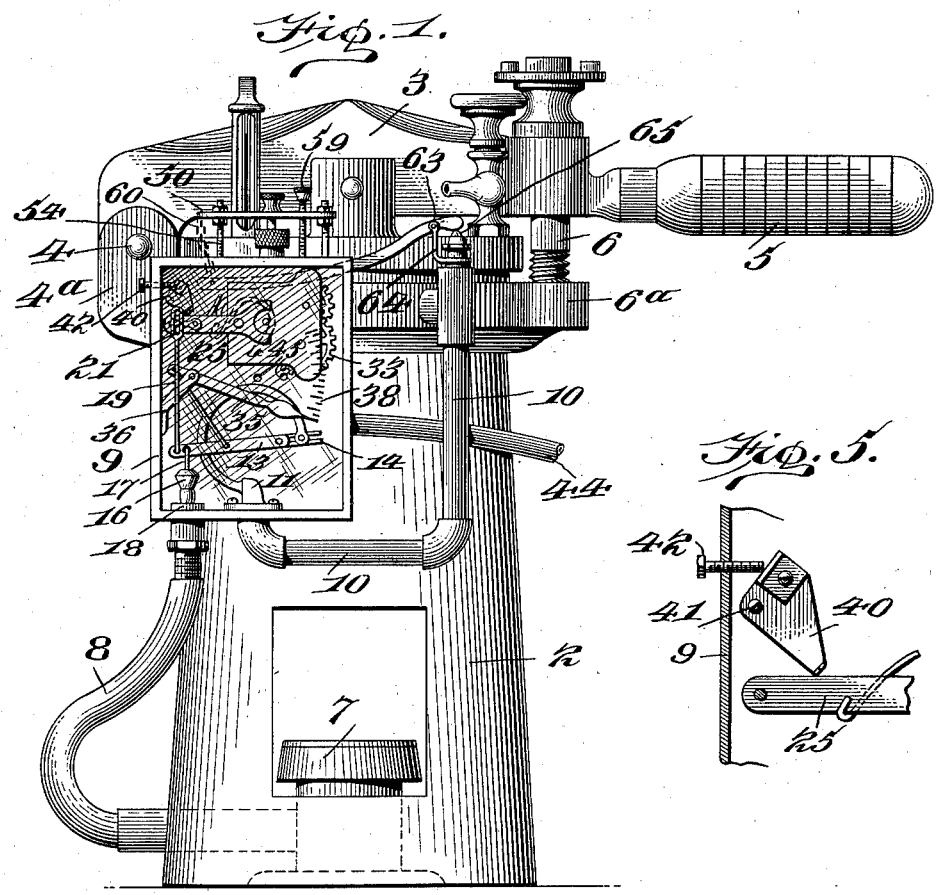
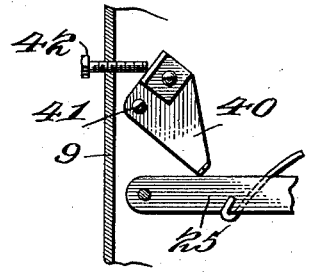
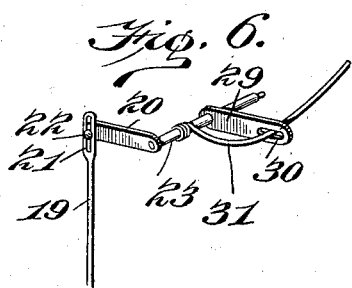
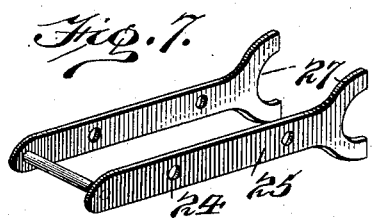

No. 752,703. PATENTED FEB. 23, 1904.
C. E. ORNDORF.
CONTROLLING DEVICE FOR VULCANIZERS OR LIKE APPARATUS.
APPLICATION FILED JUNE 15, 1903.
NO MODEL. 3 SHEETS—SHEET 2.

Witnesses:
Robert C. Totten
H. G. Dieterich

Inventor:
Cameron E. Orndorf
By Kay Totten & Winter
Attorneys:

No. 752,703. PATENTED FEB. 23, 1904.
C. E. ORNDORF.
CONTROLLING DEVICE FOR VULCANIZERS OR LIKE APPARATUS.
APPLICATION FILED JUNE 15, 1903.
NO MODEL. 3 SHEETS—SHEET 3.
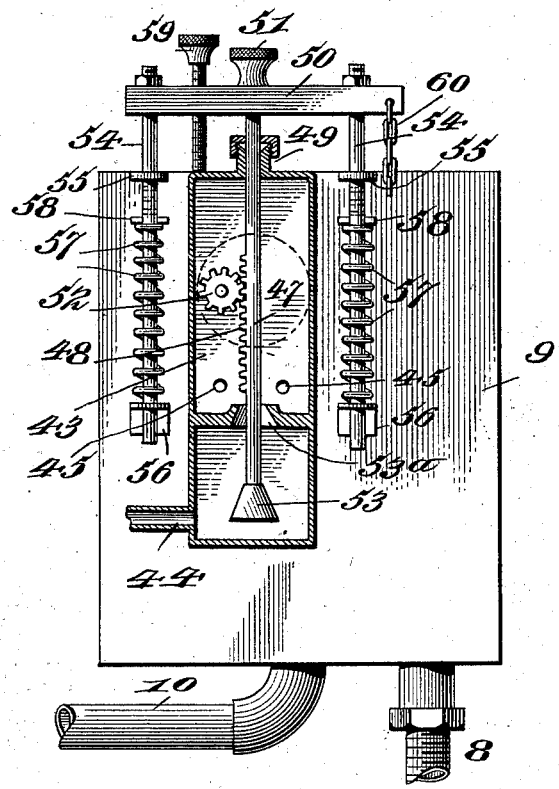
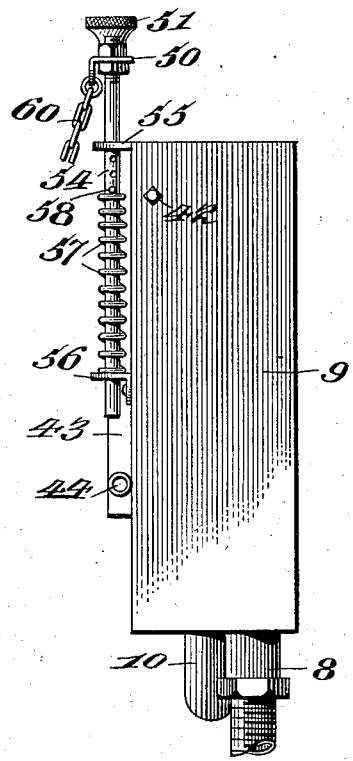

No. 752,703. Patented February 23, 1904.

UNITED STATES PATENT OFFICE.

CAMERN E. ORNDORF, OF LIGONIER, PENNSYLVANIA, ASSIGNOR OF ONE-HALF TO LEE S. SMITH & SON, OF PITTSBURG, PENNSYLVANIA, A FIRM.

CONTROLLING DEVICE FOR VULCANIZERS OR LIKE APPARATUS.

SPECIFICATION forming part of Letters Patent No. 752,703, dated February 23, 1904.

Application filed June 15, 1903. Serial No. 161,498. (No model.)

*To all whom it may concern:*

Be it known that I, CAMERN EUGENE ORNDORF, a resident of Ligonier, in the county of Westmoreland and State of Pennsylvania, have invented a new and useful Improvement in Controlling Devices for Vulcanizers or Like Apparatus; and I do hereby declare the following to be a full, clear, and exact description thereof.

My invention relates to vulcanizers and like apparatus, its object being to provide a controlling device for automatically regulating the heat, so that when the proper degree of heat is reached mechanism is put into operation for holding the heat at such a point for a prescribed period during which the vulcanizing operation takes place.

To these ends my invention comprises, generally stated, in conjunction with a suitable vulcanizer, a valve for admitting the gas to the burner, of a pressure gage and indicator operated by the steam from the chamber of the vulcanizer, and connections between said gage and clock mechanism and between said gage and valve, whereby when said indicator reaches a predetermined point on its scale said clock mechanism is put into operation and the flow of gas to the burner is so controlled as to hold the temperature at the proper degree for the period during which the clock mechanism operates, and connections between said clock mechanism and a steam-escape valve for releasing the steam at the close of the prescribed period.

My invention comprises certain other features, all of which will be hereinafter fully set forth and claimed.

To enable others skilled in the art to make and use my invention, I will describe the same with reference to the accompanying drawings, in which—

Figure 1 is a side elevation of a vulcanizer with my invention applied thereto. Fig. 2 is an enlarged view of the controller-box and the mechanism contained therein. Fig. 3 is a rear view of the controller-box, showing the gas-admission chamber and mechanism for elevating the cut-off when the clock is in operation and the movable frame for operating steam-escape valve. Fig. 4 is a side view of the controller-box. Figs. 5, 6, and 7 are enlarged detail views of parts of the device.

Like numerals indicate like parts.

In the drawings the numeral 2 designates the body of a suitable vulcanizer having at the upper end a suitable steam-chamber closed by the cover 3, pivoted at 4 to the arm $4^a$, having the handle 5, together with fastening-screw 6, for engaging the lug $6^a$ for holding said cover down in place against the pressure of the steam within the steam-chamber.

A suitable burner 7 is located within the vulcanizer, said burner being connected up to the tube 8, leading from the controller-box 9, which may be rectangular, round, or other suitable shape. A steam-pipe 10 leads from the steam-chamber and connects with the pressure-gage 11 in the controller-box 9, said gage comprising a hollow curved arm, the hollow portion being indicated in dotted lines, Fig. 2. This is a well-known form of pressure-gage formed of metal of suitable resiliency and adapted to straighten or elongate when subjected to the pressure of the steam admitted thereto. The free end 12 of the gage 11 is connected to the bar 13, said bar having the forked or slotted end 14, within which the pin 15 on the gage 11 engages, so as to allow for the play of said pin during the elongation or contraction of the gage. A valve 16 is connected by a link 17 to the bar 13, said valve being adapted to rest in a valve-seat in the connection 18, thereby controlling the passage of the gas through the pipe 8 to the burner 7.

Connected to the outer end of the bar 13 is the rod 19, the upper end of said rod being connected to the link 20, said rod having the slot 21 therein with which the pin 22 on said link engages, so as to allow for a certain amount of play of said rod 19 without imparting movement to said link 20. The opposite end of the link 20 is connected to the rock-shaft 23, which passes through the openings 24 in the rocking frame 25. This frame 25 is mounted on the shaft 26, and its outer end is forked or bifurcated, as at 27. Mounted on the shaft 23 is the bar 29, having the slot 30 formed therein. A spring 31 is wound around the shaft 23, and passing through the slot 30 said spring bears against the balance-wheel 32, said balance-wheel forming part of a suitable clock mechanism 33, which is not described in detail, as its construction forms no part of the present invention.

The rocking frame 25 is mounted, as stated, on the shaft 26, and in order to regulate the movement of said frame I employ the plate 40 pivoted at 41 and adapted to bear against the rocking frame 25, said plate being held in contact with said rocking frame by means of the set-screw 42, which bears against said plate. A spring $25^a$ forces said frame up into contact with said plate. It is apparent that by screwing up or releasing the set-screw 42 the position of the stud 22 in slot 21 may be varied and the time of operation of the clock mechanism changed.

Connected to the bar 13 is the rod 34, which is connected at the opposite end to the indicator-hand 35, said indicator-hand being pivoted to the bracket 36 at 37. This indicator-hand 35 is adapted to move over the scale 38, which may be formed upon the front plate 39 of the controller-box 9, said front plate being preferably formed of glass. The controller-box 9 may be formed of metal or other suitable material, with the glass front plate 39 so secured in place as to form a gas-tight chamber.

In the rear of the controller-box 9 is the gas-admission chamber 43, to which the gas-pipe 44 is connected. Ports 45 connect the chamber 43 with the controller-box 9 and admit the gas from said chamber to said controller-box.

Within the chamber 43 is the rack-bar 47, having the rack 48 formed thereon for a portion of its length, the upper end of said bar passing out through a suitable stuffing-box 49 and connected to the cross-bar 50. A set-screw 51 is connected to the outer end of the bar 47, and by turning said set-screw the position of the cross-arm 50 may be regulated. A pinion 52, operated by the clock mechanism above referred to, meshes with the rack-face 48 and acts to raise the bar 47. Attached to the lower end of the bar 47 is the cut-off valve 53, which is adapted to move up and fit the valve-seat $53^a$.

Connected to the cross-bar 50 are the rods 54, said rods passing down through the brackets 55 and 56 on the rear of the controller-box, and springs 57 are interposed between the lower brackets 56 and the pins 58, passing through said rods 54, the action of said springs being to normally force up the rods 54.

A set-screw 59 passes through the cross-bar 50, and said set-screw acts as a stop controlling the downward movement of the cross-bar 50. By turning said set-screw it is apparent that the distance the cross-bar 50 and parts connected thereto may be lowered is controlled by said set-screw 59.

Connected to the cross-bar 50 is the chain 60, the opposite end of said chain being connected to the lever 61, which is pivoted at 63 to the arm 64. The end of the lever 61 bears against the valve 65 in the steam-pipe 10, so that when said valve 65 is lowered by the pressure of the arm 61 the steam escapes from the steam-chamber of the vulcanizer into the atmosphere.

The operation of my improved controlling device is as follows: Where my invention is used in connection with a vulcanizer for the manufacture of dentures, the denture is placed in the ordinary flask and the flask is placed in the steam-chamber of the vulcanizer and the cover 3 secured in place by the handle 5, so as to be securely locked against the pressure of the steam. Gas is admitted to the gas-chamber 43 by the feed-pipe 44 and passing into the controller-box passes down through the pipe 8 to the burner 7, the parts being in the position shown in Figs. 1 and 2. The gas is then lighted at the burner 7, and the water in the steam-chamber is heated. As steam is generated in steam-chamber said steam passes by the pipe 10 up into the hollow gage 11 and by its pressure acts to straighten or elongate said gage, the free end thereof gradually moving up and carrying with it the outer end of the bar 13. This acts to lower the inner end of the bar 13 and to raise the outer end of the indicator-hand 35, so that said indicator-hand moves up along the scale 38. At the same time the lowering of the inner end of the bar 13 acts to lower the rod 19. As the pressure increases the indicator-hand 35 continues to move up until it has reached the proper point on the scale to indicate that the steam has reached the proper temperature—as, for instance, 320°. Meantime the rod 19 will have been gradually lowered until the pin 22 is acted on by said rod and the link 20 lowered. This lowering of the link 20 will act to rock the shaft 23, carrying the bar 29 and spring 31, releasing said spring from the balance-wheel 32. Just as soon as said balance-wheel 32 is released the clock mechanism is put into operation.

In the manufacture of dentures it is usual after the proper temperature has been reached to allow the denture to remain subject to this heat for a prescribed period—for instance, one hour. Accordingly the clock mechanism is arranged to run for one hour, and as said clock mechanism continues to operate the bar 47 is gradually elevated, carrying with it the cross-arm 50 and connecting parts. After the proper temperature has been reached and the parts have been operated in the manner described the valve 16 will have been lowered into proper position to control the gas and admit the proper amount to the burner to maintain the heat at the prescribed degree of temperature. In case the degree of heat becomes reduced the gage 11 will contract slightly and raise the valve 16, thereby admitting more gas and restoring the temperature to the required degree. The clock mechanism continues to operate, as stated, for one hour, and at the end of the hour the bar 47 will have been raised by the pinion 52 of the clock mechanism to such a point where said pinion becomes disengaged from said bar, whereupon the springs 57 will act to force up the cross-arm 50, which will pull on the chain 60 and through the lever 61 operate the valve 65 and permit the steam from the steam-chamber of the vulcanizer to escape to the atmosphere. This escaping steam, if desired, may be connected up to a suitable whistle to indicate when the vulcanizing operation has been completed. At the same time that the steam-valve is released the cut-off valve 53 is carried up to its seat 53$^a$, thereby cutting off the gas to the burner.

By the above-described apparatus the denture may be introduced into the vulcanizer and the clock mechanism having been set for exposing the denture to the action of the heat for the required period no further attention need be paid to the vulcanizer, as the mechanism described will act automatically to regulate and control the time the denture is exposed to the prescribed degree of temperature. In this manner the dentures are always assured of being subjected to the same degree of heat for the same period, so that uniformity of product is obtained, and that too without skill or close attention on the part of the operator. When once the apparatus has been set in operation, the attendant may leave it and pay no further attention to the device, thereby dispensing with a loss of time occasioned by watching to see that the heat does not become too great or that the denture is not exposed to the heat beyond the proper period.

What I claim as my invention, and desire to secure by Letters Patent, is—

1. The combination with a suitable vulcanizer having a steam-chamber and means for heating same, of clock mechanism, and connections between said clock mechanism and steam-releasing valve.

2. The combination with a suitable vulcanizer having a steam-chamber and means for heating same, of clock mechanism, means for automatically starting said clock mechanism when prescribed heat is reached, and connections between said clock mechanism and steam-releasing valve.

3. The combination with a suitable vulcanizer having a steam-chamber and means for heating same, of clock mechanism, means for starting said clock mechanism when prescribed heat is reached, means for holding heat at temperature prescribed, and means for releasing the steam by said clock mechanism.

4. The combination with a suitable vulcanizer having a steam-chamber and means for heating same, of a pressure-gage comprising a curved spring-tube, a steam-escape valve, and connections between said gage and said escape-valve.

5. The combination with a suitable vulcanizer, of a box, or casing, having a gas inlet and outlet, a valve controlling said outlet leading to burner, a steam-pressure gage, connections between said gage and said valve, clock mechanism for releasing steam from said vulcanizer, and connections between said gage and clock-starting mechanism.

6. The combination with a suitable vulcanizer, of a box, or casing, having a gas inlet and outlet, a valve controlling said inlet leading to burner, clock mechanism for releasing steam from said vulcanizer, and means for controlling said valve and starting said clock mechanism by the pressure of steam in said vulcanizer.

7. The combination with a suitable vulcanizer, of a box, or casing, having a gas inlet and outlet, a valve controlling said outlet leading to the burner, a pressure-gage comprising a curved spring-tube connected up to the steam-chamber of said vulcanizer, clock mechanism adapted to release the steam from said steam-chamber, connections between said gage and said valve, and connections between said gage and clock-starting mechanism.

8. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a lever connected to said gage, connections between said lever and said valve, and between said lever and clock-starting mechanism.

9. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a lever connected to the free end of said gage by a sliding connection, connections between said lever and said valve, and between said lever and clock-starting mechanism.

10. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a lever having a slot formed therein with which a pin on free end of said gage engages, connections between said lever and said valve, and between said lever and clock-starting mechanism.

11. The combination with a suitable vulcanizer, of a box, or casing, having gas inlet and outlet, a valve controlling the oulet leading to the burner, a pressure-gage comprising a curved spring-tube connected to the steam-chamber of said vulcanizer, clock mechanism adapted to release the steam from said steam-chamber, a lever connected to free end of said gage, connections between said lever and said valve, and a rod connecting said lever with clock-starting mechanism.

12. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a lever connected to the free end of said gage, connections between said lever and said valve, a rod connected to said lever having a slot, a link having a stud engaging said slot, and connections between said link and clock-starting mechanism.

13. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a lever connected to the free end of said gage, connections between said lever and said valve, a rod connected to said lever having a slot, a rocking frame, a rock-shaft on said frame, a link on said rock-shaft having a stud engaging said slot, clock-retarding mechanism carried by said shaft, and means for adjusting said rocking frame.

14. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a locking device to prevent the operation of said clock mechanism, connections between said gage and said valve, and between said gage and said locking device to release same.

15. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, an arm adapted to bear against balance-wheel of said clock mechanism, connections between said gage and said valve, and between said gage and said arm to withdraw same.

16. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a spring-arm adapted to bear against the balance-wheel of said clock mechanism, connections between said gage and said valve, and between said gage and said arm to withdraw same.

17. The combination with a suitable vulcanizer, of a box, or casing, having gas inlet and outlet, a valve controlling the outlet leading to the burner, a pressure-gage comprising a curved spring-tube connected to the steam-chamber of said vulcanizer, a clock mechanism adapted to release the steam from said steam-chamber, a rock-shaft, a spring-arm carried by said rock-shaft and bearing against the balance-wheel of said clock mechanism, connections between said lever and said valve, and between said gage and said rock-shaft.

18. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a rock-shaft, a projection on said shaft, a spring on said shaft passing through an opening in said projection and bearing against the balance-wheel of said clock mechanism, connections between said gage and said valve, and between said gage and said rock-shaft.

19. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a rocking frame, carrying clock-retarding mechanism, means for adjusting said rocking frame, connections between said gage and said valve, and between said gage and said clock-retarding mechanism.

20. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a spring-actuated rocking frame carrying clock-retarding mechanism, a pivotal plate bearing against said rocking frame, means for regulating the pressure of said plate, connections between said gage and said valve, and between said gage and said clock-retarding mechanism.

21. The combination with a suitable vulcanizer, of a box, or casing, having gas inlet and outlet, a valve controlling the outlet leading to the burner, a pressure-gage comprising a curved spring-tube connected to the steam-chamber of said vulcanizer, clock mechanism adapted to release the steam from said steam-chamber, a spring-actuated rocking frame carrying clock-retarding mechanism, a pivotal plate bearing against said rocking frame, a set-screw engaging said plate, connections between said gage and said valve, and between said gage and said clock-retarding mechanism.

22. The combination with a suitable vulcanizer, of a box, or casing, having a gas inlet and outlet, a valve controlling said outlet leading to burner, clock mechanism, a steam-escape valve, connections between said clock mechanism and steam-escape valve, and means for controlling said gas-valve and for starting said clock mechanism by the pressure of steam from said vulcanizer.

23. The combination with a suitable vulcanizer, of a box, or casing, having a gas inlet and outlet, a valve controlling said outlet leading to burner, clock mechanism, a steam-escape valve, a moving frame operated by said clock mechanism, connections between said frame and said steam-escape valve, and means for controlling said gas-valve and for starting said clock mechanism by the pressure of steam from said vulcanizer.

24. The combination with a suitable vulcanizer, of a box, or casing, having a gas inlet and outlet, a valve controlling said outlet leading to burner, clock mechanism, a steam-escape valve, a vertically-moving frame operated by said clock mechanism, connections between said frame and said steam-escape valve, and means for controlling said gas-valve and for starting said clock mechanism by the pressure of steam from said vulcanizer.

25. The combination with a suitable vulcanizer, of a box, or casing, having a gas inlet and outlet, a valve controlling said outlet leading to burner, clock mechanism, a steam-escape valve, a rack-bar, a pinion operated by said clock mechanism engaging said rack-bar, connections between said rack-bar and said steam-escape valve, and means for controlling said gas-valve and for starting said clock mechanism by the pressure of steam from said vulcanizer.

26. The combination with a suitable vulcanizer, of a box, or casing, having a gas inlet and outlet, a valve controlling said outlet leading to burner, clock mechanism, a steam-escape valve, a rack-bar, a pinion operated by said clock mechanism engaging said rack-bar, a cross-bar connected to said rack-bar, connections between said cross-bar and said steam-escape valve, and means for controlling said gas-valve and for starting said clock mechanism by the pressure of steam from said vulcanizer.

27. The combination with a suitable vulcanizer, of a box, or casing, having a gas inlet and outlet, a valve controlling said outlet leading to burner, clock mechanism, a steam-escape valve, a rack-bar, a pinion operated by said clock mechanism engaging said rack-bar, a cross-bar connected to said rack-bar, spring-actuated rods connected to said cross-bar, connections between said cross-bar and said steam-escape valve, and means for controlling said gas-valve and for starting said clock mechanism by the pressure of steam from said vulcanizer.

28. The combination with a suitable vulcanizer, of a box, or casing, having gas inlet and outlet, a valve controlling said outlet leading to the burner, clock mechanism, a steam-escape valve, a lever for operating same, a movable frame operated by said clock mechanism, a flexible connection between said lever and said frame, and means for controlling said gas-valve and for starting said clock mechanism by the pressure of steam from said vulcanizer.

29. The combination with a suitable vulcanizer, of a box, or casing, having gas inlet and outlet, a valve controlling said outlet leading to the burner, clock mechanism, said box having a gas-admission chamber with a port leading to said box, a cut-off valve within said chamber, connections between said cut-off valve and said clock mechanism, connections between said clock mechanism and a steam-escape valve, and means for controlling said gas-valve and for starting said clock mechanism by the pressure of steam from said vulcanizer.

30. The combination with a suitable vulcanizer, of a box, or casing, having gas inlet and outlet, a valve controlling said outlet leading to the burner, clock mechanism, said box having a gas-admission chamber with a port leading to said box, a cut-off valve within said chamber, a rack-bar connected to said cut-off valve and operated by said clock mechanism, connections between said rack-bar and a steam-escape valve, and means for controlling said gas-valve and for starting said clock mechanism by the pressure of steam from said vulcanizer.

In testimony whereof I, the said CAMERN EUGENE ORNDORF, have hereunto set my hand.

CAMERN E. ORNDORF.

Witnesses:
ROBT. D. TOTTEN,
ROBERT C. TOTTEN.